United States Patent
McTaggart

(10) Patent No.: US 7,758,957 B2
(45) Date of Patent: Jul. 20, 2010

(54) CIRCULAR TAPE

(76) Inventor: Debra J. McTaggart, 20921 Wood Rd., Leavenworth, KS (US) 66048

( * ) Notice: Subject to any disclaimer, the term of this patent is extended or adjusted under 35 U.S.C. 154(b) by 1001 days.

(21) Appl. No.: 11/508,713

(22) Filed: Aug. 23, 2006

(65) Prior Publication Data

US 2008/0047661 A1    Feb. 28, 2008

(51) Int. Cl.
B32B 7/12 (2006.01)
B32B 15/04 (2006.01)

(52) U.S. Cl. ........................ 428/343; 428/354

(58) Field of Classification Search .................. 428/343, 428/354
See application file for complete search history.

(56) References Cited

U.S. PATENT DOCUMENTS

| 1,135,110 A | 4/1915 | Hall |
| 2,555,564 A | 6/1951 | Berman |
| 4,500,580 A | 2/1985 | Luciani |
| 4,558,888 A | 12/1985 | Hanson et al. |
| 4,690,413 A | 9/1987 | Adkins |
| 5,260,097 A | 11/1993 | Silvestre |
| 5,464,692 A | 11/1995 | Huber |
| 6,383,567 B2 | 5/2002 | Ager et al. |
| 6,793,998 B1 | 9/2004 | Silvestre |

FOREIGN PATENT DOCUMENTS

| DE | 19907992 | 8/2000 |
| JP | 2006225620 A * | 8/2006 |

OTHER PUBLICATIONS

Derwent abstract of JP2006-225620.*

* cited by examiner

*Primary Examiner*—Victor S Chang
(74) *Attorney, Agent, or Firm*—John C. McMahon

(57) ABSTRACT

A masking tape, tape roll and method of masking for surface treatment, such as painting, along a curved juncture includes a flat adhesive strip with opposed curved edges running along an entire length of the strip. The flat strip is wound about a central axis in a helically wound tape roll with the strip adhesive surface being disposed substantially perpendicular to the central axis. A curved length of tape, and circular pieces of tape are readily separable from the roll by pulling a desired curved length of the tape away from the roll substantially parallel to the central axis and then separating the tape segment from the roll.

10 Claims, 1 Drawing Sheet

CIRCULAR TAPE

BACKGROUND OF THE INVENTION

The present application relates to masking products and methods for use during surface treatments, such as house painting and auto body work, to cover or otherwise protect surface areas where the surface treatment is not wanted. In particular, the application relates to adhesive tape for masking a first area or object during the painting or other surface treatment of a second area or object when a juncture between the first and second areas or objects is curved.

When preparing a structure for a surface treatment, such as painting, a variety of items that are not to be painted must be covered or otherwise protected during the painting operation. Junctures or borders between items to be painted and those to be protected are often curved, such as those bordering lights, door knobs, support beams, shafts and poles, just to name a few. The process of protecting such areas is tedious and time consuming if traditional linear strips of masking tape are used as the tape cannot be easily flexed around a curve. Thus, additional time must be spent applying multiple strips of tape along the curve.

Stretchable plastic tapes have been disclosed in the art for use around curved structures. Such tapes are provided on a traditional tape roll with edges of the tape initially being linear. Such tape is then flexed or stretched about curved objects or areas to be painted or protected. However, such tapes may not stretch an adequate amount about a curved surface, may tear while being stretched, or if strong enough to resist tearing, may not be easily torn or separated manually when being removed from the tape roll or being shortened to a desired size for use. Furthermore, certain plastic tapes are more expensive than the paper-based varieties. Accordingly, there is a need in the art for an improved mask for curved areas that maintains the low cost value and ease of use of paper-based masking tapes.

SUMMARY OF THE INVENTION

A masking tape according to the invention for protecting curved objects or surface areas during a surface treatment such as painting includes a flat elongate strip having a continuous surface with a releasably adherent surface treatment thereon, preferably a pressure sensitive adhesive. A pair of elongate spaced curved edges run along a length of the strip on either side of the adherent surface, allowing for ease in protecting curved areas, particularly objects that have a circular cross-section. The curved edges are preferably concentric, allowing for the tape to be mounted or wound with the continuous adherent surface oriented substantially perpendicular to a central axis of a resulting tape roll, the tape being wound upwardly in a direction parallel to the central axis in a helical fashion as compared to typical linear tape that is wound outwardly from a central axis. The masking tape may be made of a variety of materials but is preferably made from a material that is easily separated or torn from the roll, such as paper-based masking tape.

Masking tape rolls according to the invention may be made in a variety of sizes and widths, the inner or outer radius of the tape edges being chosen to generally correspond with the radius of the curved surface to be painted or protected. Even where the area to be protected is of a different curvature than the tape, the curved tape according to the invention may be slightly overlapped, pleated or separated more easily than traditional linear masking tape during the taping process.

A method of using the inventive masking tape of the invention includes the step of providing a roll of wound masking tape having a continuous surface treated with an adhesive, the continuous surface being oriented substantially perpendicular to a central axis of the masking tape roll, and having opposed curved edges. The method includes removing a curved length of the tape from the roll by pulling the tape away from the roll in a direction generally parallel to a central axis of the roll and placing the treated surface on the area to be masked with a curved edge of the tape oriented with and located on the curved boundary.

OBJECTS OF THE INVENTION

Therefore, objects of the present invention include: providing a releaseable tape for protecting objects or surface areas from a surface treatment, such as paint; providing such a tape that includes curved edges; providing such a tape that is wound on a circular tape roll; and providing such tape that is inexpensive to produce, easy to manually separate and especially well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
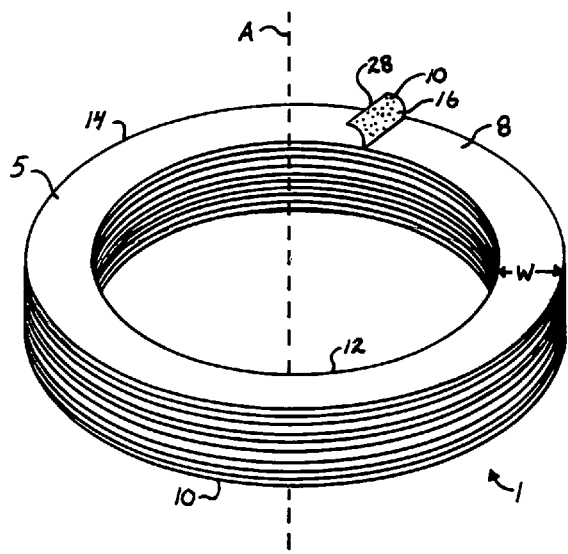
FIG. 1 is a perspective view of a first tape roll according to the invention.

With reference to FIG. 1, the reference numeral 1 generally designates a circular, helically wound masking tape roll according to the invention. Specifically, the tape 1 is made from a substantially flat, elongate continuous strip or web 5 having a top surface 8, a bottom surface 10, an inner curved edge 12 and an outer curved edge 14. The curved edges 12 and 14 run along an entire length of the strip 5. It is noted that the reference to the words top and bottom, upper and lower, and the like, as used herein refers to the alignment shown in the various drawings, as well as some of the normal connotations applied thereto, and is not intended to restrict positioning of the tape strips 5 in actual use.

The strip 5 is made from a material that allows for easy separation, such as tearing of the strip 5 from the roll 1, including paper and plastic materials. Preferably, the strip 5 is made from a paper-based masking tape material. However, it is foreseen that if more rigorous surface treatment applications are performed, such as etching or plating, tape made from polyester or other polymers may be desirable.

Figure 3:
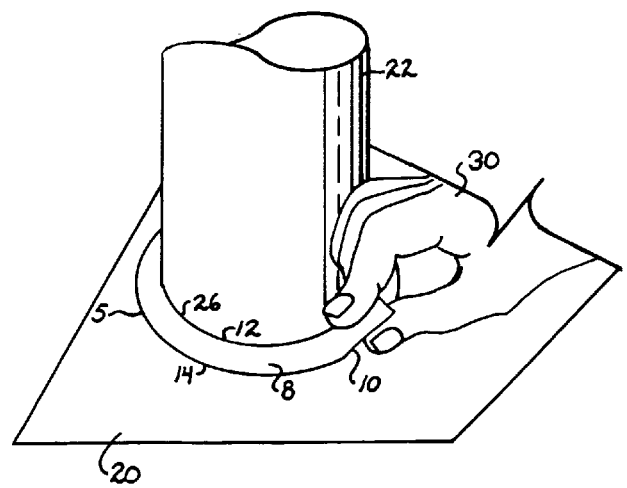
FIG. 3 is a reduced perspective view showing the tape roll of FIG. 1 being placed on a surface surrounding a pole prior to painting or other surface treatment of the pole.

With reference to FIGS. 1 and 3, the bottom continuous surface 10 includes an adhesive coating or treatment 16 along an entire length thereof. The coating or treatment 16 provides a relatively weak bond so that the strip 5 is easily removed from a surface 20 after completion of painting or other surface treatments on an adjacent object or area, such as an illustrated pole 22. Preferably, the coating or treatment 16 is a pressure sensitive adhesive. Pressure sensitive adhesive tapes are typically made by applying an adhesive emulsion to a paper or plastic strip or film.

As illustrated in FIG. 1, the inner curved edge 12 and the outer curved edge 14 are preferably generally circular and concentric, both having a curvature with a radius originating at a central axis A. Thus, the strip 5 may be wound about the axis A in a helix, with the top and bottom flat surfaces 8 and 10 both oriented substantially perpendicular to the axis A. As illustrated in FIG. 1, the downwardly facing surface 10 having the adhesive coating or treatment 16 is wound in a continuous series of loops, the surface 10 contacting the surface 8 of the previous or lower loop and weakly adhering thereto, to form the cylindrical tape roll 1 having a substantially uniform web width W measured radially between the edge 12 and the edge 14.

Figure 2:
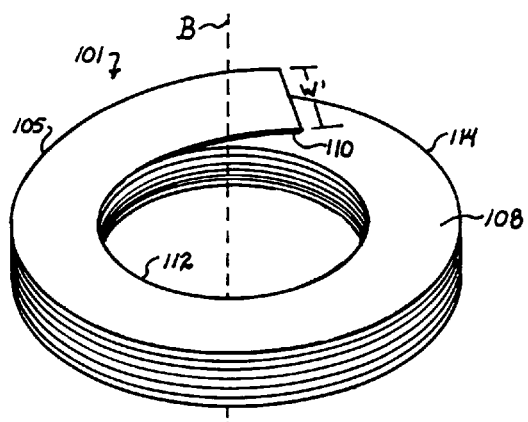
FIG. 2 is perspective view of a second tape roll according to the invention.

With reference to FIG. 2, a masking tape roll 101 substantially similar to the roll 1 is illustrated that includes a substantially flat continuous strip 105 having a top surface 108, a bottom surface 110, an inner curved edge 112 and an outer curved edge 114. The bottom surface 110 is coated with an adhesive (not shown). Similar to the masking tape roll 1, the roll 101 curved edges 112 and 114 are concentric, each having a radius originating from a central axis B. The masking tape roll strip or web 105 has a uniform web width W' measured radially along the surface 108 from the edge 112 to the edge 114 that is greater than the uniform width W measured between the edge 12 and the edge 14 along the surface 8 of the tape strip 5. Furthermore, the radius of curvature of the inner edge 112 of the strip 105 is smaller than the radius of curvature of the inner edge 12 of the strip 5. Thus, the tape strip 105 is sized and shaped to extend about a curved surface or area that is smaller or more tightly radiused than, for example, the pole 22, about which the tape strip 5 is shown to closely surround. As illustrated in FIGS. 1 and 2, it is possible to provide curved tape and curved tape rolls according to the invention in a variety of inner and outer radial lengths and strip or web widths. For example, tape rolls according to the invention may be provided having inner radius of curvature at standard increments, for example, at every ¼ inch or ½ inch inner radius increments, to allow a painter or other user to choose a desired size of tape strip based upon the size of curvature of the objects or areas at the juncture to be protected. If a curved juncture between a surface to be treated and a surface to be masked has a smaller radius of curvature than a tape role 1 or 101 available to a user, the tape of the invention may easily be extended around the smaller curved item or space because of the inner curved edge, even if the tape is otherwise relatively non-stretchable, paper-based masking tape.

With reference to FIG. 1, in use, a desired curved length of the strip 5 is removed from the roll 1 by first pulling the strip 5 initially generally upwardly away from the roll (a direction substantially parallel to the axis A) at a leading edge 28 thereof, and then tearing or otherwise separating a curved length of strip 5' from the roll 1. If a circular item is to be surrounded, such as the pole 22 shown in FIG. 3, a full revolution of the tape role 1 is desirable, resulting in the substantially circular piece of tape 5'. The separated curved strip 5' is then placed about the curved object, in the illustration the pole 22, and over the surface 20 to be protected at a curved juncture or border 26 where the cylindrical surface to be painted joins the flat surface 20 to be protected. The substantially circular tape segment 5' is pressed on the surface 20 by hand 30 with the inner curved edge 12 placed adjacent the pole 22. After the painting process, the tape segment 5' is simply removed by hand 30 by pulling the tape upwardly away from the surface 20.

It is to be understood that while certain forms of the present invention have been illustrated and described herein, it is not to be limited to the specific forms or arrangement of parts described and shown.

What is claimed and desired to be secured by Letters Patent is as follows:

1. In a tape roll including an elongate strip of tape wound in a circular formation about a central axis of the roll, the wound tape having a continuous surface treated with an adhesive, the improvement wherein:

a) the continuous surface is oriented substantially perpendicular to the central axis.

2. The improvement of claim 1 comprising a pair of curved substantially uniformly spaced elongate edges on either side of the continuous surface.

3. The improvement of claim 2 wherein the pair of curved edges are concentric.

4. The improvement of claim 1 wherein the adhesive is a pressure sensitive adhesive.

5. The improvement of claim 1 wherein the tape roll is made from a material that is readily manually separable from the roll.

6. The improvement of claim 1 wherein the tape roll is substantially made from paper.

7. A masking tape for protecting a first area during surface treatment of an adjacent area, a juncture between the first and second areas being curved, the tape comprising:

a flat substantially non-stretchable strip having a first surface with a releasably adherent surface treatment thereon, an opposed second surface, and a pair of elongate spaced curved edges running along a length of the strip on either side of the first and second surfaces, the edges being substantially concentric; and wherein the flat strip is wound about a central axis in a helically wound tape roll with the first and second surfaces being disposed substantially perpendicular to the axis.

8. The tape of claim 7 wherein the releasably adherent surface treatment is a pressure sensitive adhesive.

9. The tape of claim 7 made from a material that is readily manually separable.

10. The tape of claim 7 made substantially from paper.

* * * * *